US012013817B2

(12) United States Patent
Li et al.

(10) Patent No.: US 12,013,817 B2
(45) Date of Patent: Jun. 18, 2024

(54) MULTI-SHARED DIRECTORY TREE-ORIENTED CONTROL METHOD AND SYSTEM

(71) Applicant: INSPUR SUZHOU INTELLIGENT TECHNOLOGY CO., LTD., Jiangsu (CN)

(72) Inventors: Shijie Li, Jiangsu (CN); Duan Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 106 days.

(21) Appl. No.: 17/799,705

(22) PCT Filed: Sep. 24, 2020

(86) PCT No.: PCT/CN2020/117514
§ 371 (c)(1),
(2) Date: Aug. 15, 2022

(87) PCT Pub. No.: WO2021/159713
PCT Pub. Date: Aug. 19, 2021

(65) Prior Publication Data
US 2023/0086123 A1 Mar. 23, 2023

(30) Foreign Application Priority Data
Feb. 14, 2020 (CN) .......................... 202010093617.8

(51) Int. Cl.
*G06F 17/00* (2019.01)
*G06F 7/00* (2006.01)
(Continued)

(52) U.S. Cl.
CPC ........ *G06F 16/1767* (2019.01); *G06F 16/137* (2019.01); *G06F 16/16* (2019.01); *G06F 16/185* (2019.01)

(58) Field of Classification Search
CPC .... G06F 16/1767; G06F 16/16; G06F 16/137; G06F 16/185
(Continued)

(56) References Cited

U.S. PATENT DOCUMENTS 10,642,667 B1 * 5/2020 Babu ...................... G06F 9/544
10,949,387 B1 * 3/2021 Grider .................... G06F 16/14
(Continued)

FOREIGN PATENT DOCUMENTS

CN    102629425 A    8/2012
CN    103002027 A    3/2013
(Continued)

OTHER PUBLICATIONS

International Search Report of corresponding PCT application (PCT/CN2020/117514); Dec. 23, 2020; 5 pgs.
Written Opinion of International Searching Authority of corresponding PCT application (PCT/CN2020/117514); Dec. 23, 2020; 9 pgs.
(Continued)

*Primary Examiner* — Pavan Mamillapalli
(74) *Attorney, Agent, or Firm* — Cooper Legal Group LLC (57) ABSTRACT

Disclosed in the present application are a multi-shared directory tree-oriented control method and system. The method includes: setting a number of circular queues and a number of worker execution units in a Samba configuration file of a server according to a number of directories to be shared; running a Samba main process on the server; obtaining a data read-write test request from a client; and orienting request tasks of individual directories to individual worker execution units according to the data read-write test request by using a Server Message Block (SMB) message header
(Continued)

data-based adaptive equalization control algorithm. The system includes an Input/Output (IO) execution unit, a plurality of worker execution units, a setting unit, a request obtaining unit, and a concurrency control unit. According to the present application, the data processing efficiency of a Samba server and the data processing efficiency of a client may be effectively improved.

15 Claims, 3 Drawing Sheets

(51) Int. Cl.
*G06F 16/13* (2019.01)
*G06F 16/16* (2019.01)
*G06F 16/176* (2019.01)
*G06F 16/185* (2019.01)

(58) Field of Classification Search
USPC .......................................................... 707/704
See application file for complete search history.

(56) References Cited

U.S. PATENT DOCUMENTS

| | | | | |
|---|---|---|---|---|
| 11,874,807 | B1* | 1/2024 | Neufeld | H04L 67/565 |
| 2012/0066414 | A1* | 3/2012 | Ho | H04L 67/1097 710/52 |
| 2012/0089781 | A1* | 4/2012 | Ranade | G06F 16/183 711/E12.001 |
| 2018/0113738 | A1* | 4/2018 | Nichols | G06F 9/4881 |

FOREIGN PATENT DOCUMENTS

| | | |
|---|---|---|
| CN | 106933672 A | 7/2017 |
| CN | 108055314 A | 5/2018 |
| CN | 108848007 A | 11/2018 |
| CN | 110519329 A | 11/2019 |
| CN | 111309700 A | 6/2020 |

OTHER PUBLICATIONS

Zhou, Changchun et al., Non-official translation: "Research on File Sharing Management System Based on Samba", Network Security Technology & Application, No. 2, Feb. 15, 2009; 5 pgs.

* cited by examiner

MULTI-SHARED DIRECTORY TREE-ORIENTED CONTROL METHOD AND SYSTEM

This application claims priority to Chinese Patent Application No. 202010093617.8, filed on Feb. 14, 2020, in China National Intellectual Property Administration and entitled "Multi-Shared Directory Tree-Oriented Control Method and System", the contents of which are hereby incorporated by reference in its entirety.

FIELD

The present application relates to the technical field of information sharing, and particularly to a multi-shared directory tree-oriented control method and system.

BACKGROUND

As cloud data center becomes increasingly popular, more and more enterprises have set up their own cloud office platforms and configured Network Attached Storage (NAS) devices (the NAS device represents a storage device mounted from a network side to a local side) on the cloud office platforms, thereby conveniently providing massive storage spaces and backup functions for employees of the enterprises. NAS used by the NAS device may be implemented only by mapping a network path node to a local drive letter or directory.

Currently, a main protocol used in a cloud office platform is a Server Message Block (SMB) (a protocol name, a protocol for sharing transmission between different network nodes after major revisions made by Microsoft) sharing protocol, a unified standard proposed by Microsoft for sharing between different device networks. Samba, an open-source organization on a Linux platform, implements mounting of a Linux system directory to a Windows client following this sharing protocol. Samba (implementing the SMB protocol for an application that provides shared service from a Linux server to a Windows client) is implemented in a user space, and provides a multi-process directory sharing mode by default. Therefore, how to design a multi-shared directory tree-oriented control method is an important issue.

A main existing multi-shared directory tree-oriented control method is enabling a server to provide multiple shared directories according to an existing SMB protocol such that a client may mount multiple shared directories. During running, the client judges whether the shared directories of the server are needed by the client based on Internet Protocol (IP) addresses and Transmission Control Protocol (TCP) port numbers of the shared directories. If the shared directories are needed by the client, data interaction is performed.

However, in the existing multi-shared directory tree-oriented control method, when the client judges shared directories of the server, if the client mounts multiple shared directories, it may be determined that the IP addresses and TCP port numbers of the multiple shared directories of the server are consistent. As a result, the same socket is written to each command request, and correspondingly, the server also uses the same smb daemon (smbd) subprocess (an SMB server background process generated by Samba code compiling) for processing. Therefore, in the client, when a large number of data files are read from or written to one directory, the other mounted directories respond relatively slowly, making the data processing efficiency of the client relatively low.

SUMMARY

The present application provides a multi-shared directory tree-oriented control method and system, so as to solve the problem of relatively low data processing efficiency of a client in the prior art.

In order to solve the foregoing technical problem, embodiments of the present application disclose the following technical solutions.

A multi-shared directory tree-oriented control method is provided, including:
  setting a number of circular queues and a number of worker execution units in a Samba configuration file of a server according to a number of directories to be shared, the worker execution unit is configured to perform a calculation process in a Samba process, the circular queue is configured to perform data exchange between an Input/Output (IO) execution unit and the worker execution unit, and the IO execution unit is configured to obtain a directory request and orient the directory request to a corresponding worker execution unit;
  running a Samba main process on the server;
  obtaining a data read-write test request from a client; and
  orienting, by the server, request tasks of individual directories to individual worker execution units according to the data read-write test request by using an SMB message header data-based adaptive equalization control algorithm, one IO execution unit is matched with a plurality of the worker execution units.

In an embodiment, the step of orienting, by the server, request tasks of individual directories to individual worker execution units according to the data read-write test request by using the SMB message header data-based adaptive equalization control algorithm includes:
  setting a hash table length for a TREE Identifier (ID) and a remainder N for a division method according to a number of practically shared directories of the server, the division method is used to calculate a hash table index;
  extracting a TREE ID field in an input-port SMB message;
  judging whether the TREE ID field is 0;
  in response to the TREE ID field being 0, executing an original Samba processing logic in the IO execution unit;
  in response to the TREE ID field not being 0, calculating and determining a corresponding circular queue through a hash table by taking the TREE ID field of header data of the SMB message as a keyword;
  calculating, by the IO execution unit, an input flow rate according to a time interval between the currently received input-port SMB message and a latest message with the same TREE ID;
  judging whether the input flow rate exceeds a set input flow rate threshold;
  in response to the input flow rate exceeding the set input flow rate threshold, enabling a new worker execution unit; and
  associating the new worker execution unit with the IO circular queue corresponding to the TREE ID field.

In a further embodiment, the method further includes:
  performing concurrency control on the IO execution unit and the worker execution unit by using a lock-free atomic operation queue.

In a further embodiment, the lock-free atomic operation queue is a Compare And Swap (CAS, a CAS technology in Central Processing Unit (CPU) instructions, used to resolve thread conflicts to implement lock-free processing under multiple concurrencies) atomic operation queue.

In a further embodiment, the step of performing concurrency control on the IO execution unit and the worker execution unit by using the lock-free atomic operation queue includes:

in an input direction, setting a concurrent lock-free atomic operation queue between the IO execution unit and each worker execution unit, and in response to an SMB message flow rate increasing, enabling a new worker execution unit;

in an output direction, setting a concurrent lock-free atomic operation queue between each worker execution unit and the IO execution unit;

during data storage, encapsulating an input message as a fixed-length request object in Samba;

during concurrent data processing, setting that a single-producer multiple-consumer model is used for an input-direction circular queue and that a multiple-producer single-consumer model is used for an output-direction circular queue; and by a producer, continuously writing data and modifying a position of a writer pointer, and by a consumer, continuously reading data and modifying a position of a read pointer.

A multi-shared directory tree-oriented control system is provided, arranged at a server and including: an IO execution unit, a plurality of worker execution units, a setting unit, a request obtaining unit, and a concurrency control unit. The IO execution unit is matched with the plurality of worker execution units.

The worker execution unit is configured to perform a calculation process in a Samba process.

The setting unit is configured to set a number of circular queues and a number of worker execution units in a Samba configuration file of a server according to a number of directories to be shared, the circular queue is configured to perform data exchange between the IO execution unit and the worker execution unit.

The request obtaining unit is configured to obtain a data read-write test request from a client.

The IO execution unit is configured to orient request tasks of different directories to different worker execution units according to the data read-write test request by using an SMB message header data-based adaptive equalization control algorithm.

The concurrency control unit is configured to perform concurrency control on the IO execution unit and the worker execution unit by using a lock-free atomic operation queue.

In a further embodiment, the IO execution unit includes:
an IO module, configured to obtain SMB message data, and when a TREE ID field is not 0, calculate and determine a corresponding circular queue and worker execution unit through a hash table by taking the TREE ID field as a keyword; and
a monitoring module, configured to calculate an input flow rate of messages corresponding to each TREE ID, and judge whether the input flow rate exceeds a set input flow rate threshold.

In a further embodiment, the IO module includes:
a setting submodule, configured to set a hash table length for a TREE ID and a remainder N for a division method according to a number of practically shared directories of the server;
an extraction submodule, configured to extract the TREE ID field in an input-port SMB message;
a first judgment submodule, configured to judge whether the TREE ID field is 0;
a first execution submodule, configured to, when the TREE ID field is 0, execute an original Samba processing logic in the IO execution unit; and
a second execution submodule, configured to, when the TREE ID field is not 0, calculate and determine the corresponding circular queue and worker execution unit through the hash table by taking the TREE ID field of header data of the SMB message as the keyword.

In a further embodiment, the monitoring module includes:
an input flow rate calculation submodule, configured to calculate an input flow rate according to a time interval between the currently received input-port SMB message and a latest message with the same TREE ID;
a second judgment submodule, configured to judge whether the input flow rate exceeds the set input flow rate threshold;
an enabling submodule, configured to, when the input flow rate exceeds the set input flow rate threshold, enable a new worker execution unit; and
an association submodule, configured to associate the new worker execution unit with the IO circular queue corresponding to the TREE ID field.

In a further embodiment, the concurrency control unit includes:
an input control module, configured to, in an input direction, set a concurrent lock-free atomic operation queue between the IO execution unit and each worker execution unit;
an output control module, configured to, in an output direction, set a concurrent lock-free atomic operation queue between each worker execution unit and the IO execution unit;
an enabling module, configured to, when an SMB message flow rate increases, enable a new worker execution unit;
a request object encapsulation module, configured to, during data storage, encapsulate an input message as a fixed-length request object in Samba;
a model setting module, configured to, during concurrent data processing, set that a single-producer multiple-consumer model is used for an input-direction circular queue and that a multiple-producer single-consumer model is used for an output-direction circular queue; and
a pointer modification module, configured to modify a position of a writer pointer when a producer writes data, and modify a position of a read pointer when a consumer reads data.

The technical solutions provided in the embodiments of the present application may have the following beneficial effects.

The present application provides a multi-shared directory tree-oriented control method. According to the method, a number of circular queues and a number of worker execution units are set first in a Samba configuration file of a server according to a number of directories to be shared, then a Samba main process is run on the server, a data read-write test request is obtained from a client, and request tasks of individual directories are oriented to individual worker execution units according to the request by using an SMB message header data-based adaptive equalization control algorithm. In the present embodiment, one IO execution unit is matched with a plurality of the worker execution units. In the present embodiment, request tasks of individual directories are oriented to individual worker execution units by using the SMB message header data-based adaptive equalization control algorithm, whereby fast and reliable concurrent processing of multiple shared directory trees may be implemented, and furthermore, a data request of a client may be appropriately hashed and sent to corresponding input queues. Therefore, the problem of nonfluency caused by an existing serial processing mode may be solved effectively. Since the tasks are processed concurrently by the plurality of worker execution units, the execution efficiency of a smbd subprocess may be improved effectively. Therefore, the data processing efficiency of the Samba server may be improved effectively by the method. In addition, when a client mounts multiple NAS directories of the same server, the influence of operating one of the directories with large files on read-write processes of the other directories is reduced greatly, whereby the file read-write speed of the client for shared directories is increased, which contributes to improving the data processing efficiency of the client. Moreover, the reduction of the influence of operations over one directory on the other directories contributes to improving user experience of the client in operating network files.

The present application also provides a multi-shared directory tree-oriented control system. The system is arranged at a server and mainly includes: an IO execution unit, a plurality of worker execution units, a setting unit, a request obtaining unit, and a concurrency control unit. The IO execution unit is matched with the plurality of the worker execution units. With the setting of the IO execution unit, request tasks of individual directories may be oriented to individual worker execution units according to a data read-write test request by using an SMB message header data-based adaptive equalization control algorithm, whereby load-balanced read-write of high-concurrency data under the same socket is implemented, furthermore, the influence between individual shared directories is reduced, and the processing of multiple working directories by the client is accelerated. With the setting of the concurrency control unit, the concurrent processing effect of a CPU may be fully utilized in a Samba sharing server by use of a lock-free atomic operation queue to greatly accelerate the response of Samba shared service, whereby the data processing efficiency of a client is improved, and the user experience is improved.

It is to be understood that the above general description and the following detailed description are only exemplary and explanatory and not intended to limit the present application.

BRIEF DESCRIPTION OF THE DRAWINGS

The accompanying drawings, which are incorporated in and constitute a part of this specification, illustrate embodiments consistent with the present application and, together with the specification, serve to explain the principle of the present application.

In order to describe the technical solutions in the embodiments of the present application or the prior art more clearly, the drawings required to be used in descriptions about the embodiments or the prior art will be introduced briefly below. Apparently, those ordinarily skilled in the art may further obtain other drawings according to these drawings without creative work.

DETAILED DESCRIPTION

In order to make the technical solutions in the present application understood better by those skilled in the art, the technical solutions in the embodiments of the present application will be described clearly and completely below in combination with the drawings in the embodiments of the present application. Clearly, the described embodiments are not all but only part of embodiments of the present application. All other embodiments obtained by those ordinarily skilled in the art based on the embodiments in the present application without creative work shall fall within the scope of protection of the present application.

A multi-shared directory tree-oriented control method and system in the present disclosure involve an adaptive equalization concurrency control strategy when the same client is connected with multiple shared directory trees of a server in an environment that Samba is run on a Linux system of a cloud data center to provide NAS service. An IO process and a calculation process are separated in an existing SMB-protocol-based processing process of Samba. The IO process is mainly oriented to data transmission of a network card, and the background calculation process is mainly oriented to the running speed.

In order to understand the present application better, implementation modes of the present application will be explained below in detail in combination with the drawings.

Embodiment 1

Figure 1:
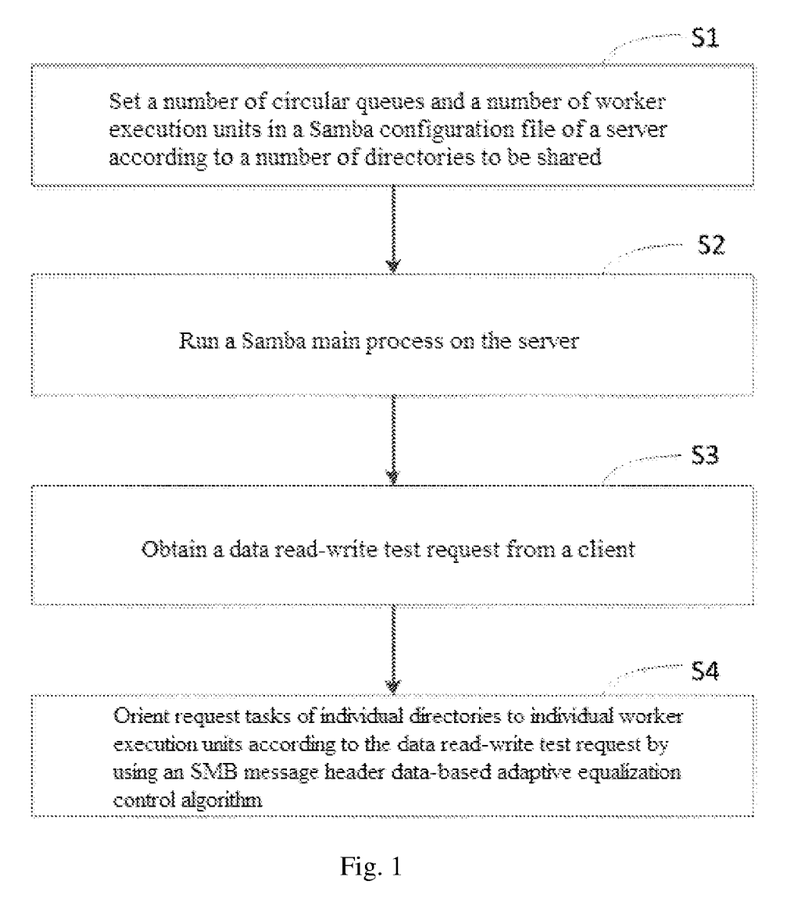
FIG. 1 is a schematic flowchart of a multi-shared directory tree-oriented control method according to an embodiment of the present application.

Referring to FIG. 1, FIG. 1 is a schematic flowchart of a multi-shared directory tree-oriented control method according to an embodiment of the present application. As shown in FIG. 1, the multi-shared directory tree-oriented control method in the present embodiment mainly includes the following process.

In S1, a number of circular queues and a number of worker execution units are set in a Samba configuration file of a server according to a number of directories to be shared.

The worker execution unit is configured to perform a calculation process in a Samba process. The circular queue is configured to perform data exchange between an IO execution unit and the worker execution unit. The IO execution unit is configured to obtain a directory request and orient the directory request to a corresponding worker execution unit.

Figure 2:
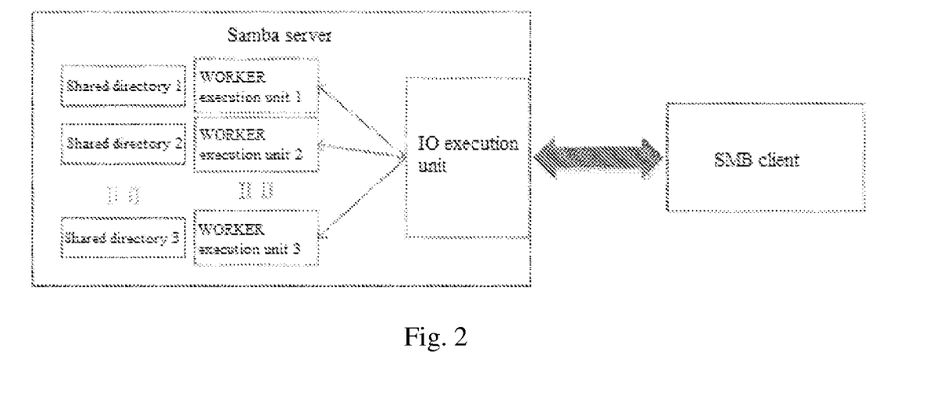
FIG. 2 is a schematic structural diagram of an overall relationship between a server and a client.

In the present embodiment, after a server is started, a configuration file is set first. The server configures the configuration file according to an obtained instruction. In the present embodiment, a schematic structural diagram of an overall relationship between the server and a client may refer to FIG. 2. In FIG. 2, Samba server is the server, and SMB client is the client. As shown in FIG. 2, one IO execution unit corresponds to a plurality of worker execution units. Worker execution units may be added dynamically.

Referring back to FIG. 1, after configuration is completed, step S2 is performed: a Samba main process is run on the server.

Specifically, when a Samba main process receives mounting of a first shared directory to the client, and is forked to obtain a smbd subprocess for initialization, an IO thread and a plurality of worker threads are created as execution units. That is, an IO execution unit and a plurality of worker execution units are created. Appropriate circular queues are created between the IO thread and the worker threads for data exchange.

Then, the client mounts a plurality of shared directories of the server to continue mass data read-write tests. In such case, the client mounts a plurality of shared directories of the server, and sends a data read-write test request to the server. That is, step S3 is performed at the server: a data read-write test request from a client is obtained.

In S4, request tasks of individual directories are oriented to individual worker execution units according to the data read-write test request by using an SMB message header data-based adaptive equalization control algorithm. One IO execution unit is matched with a plurality of the worker execution units.

In the present embodiment, the SMB message header data-based adaptive equalization control algorithm is specifically an SMB message header TREE ID-based adaptive equalization algorithm.

Specifically, step S4 includes the following process.

In S41, a hash table length for a TREE ID and a remainder N for a division method are set according to a number of practically shared directories of the server, the division method is used to calculate a hash table index.

The division method, a method for constructing a hash function, is used to permanently calculate a hash table index. In the present embodiment, a hash table length for a TREE ID and a remainder N for a division method are determined according to a number of practically shared directories of the server. Since the TREE ID is a 4-byte random integer, but there are usually not so many practically shared directories, the hash table length is valued appropriately according to the number of the practically shared directories, and when a hash conflict occurs, a hash table is further looked up according to the number of the practically shared directories of the server and a de-indexed synonym chain by use of a chain address method.

In S42, a TREE ID field in an input-port SMB message is extracted.

In the present embodiment, the TREE ID is taken as a keyword for load balancing.

After the keyword is extracted, step S43 is performed: whether the TREE ID field is 0 is judged.

If the TREE ID field is 0, step S44 is performed: an original Samba processing logic is executed in the IO execution unit.

If the TREE ID field is not 0, step S45 is performed: a corresponding circular queue is calculated and determined through a hash table by taking the TREE ID field of header data of the SMB message as a keyword.

It can be seen from the above steps S44 and S45 that, in the present embodiment, if the TREE ID field is 0, it indicates that the server and the client are in a negotiation and session setup phase and directory connection is requested for the first time, and processing is performed directly in the IO execution unit. If the TREE ID field is not 0, the IO execution unit calculates and allocates an appropriate input-direction circular queue by taking the TREE ID as the keyword.

After the IO execution unit calculates and allocates appropriate input-direction circular queues for the request tasks, step S46 is performed: the IO execution unit calculates an input flow rate according to a time interval between the currently received input-port SMB message and a latest message with the same TREE ID.

In S47, whether the input flow rate exceeds a set input flow rate threshold is judged.

In the present embodiment, a flow rate control threshold and a sampling time interval for message rate calculation are set according to the number of the practically shared directories and in combination with a practical processing capability of the server.

If the input flow rate exceeds the set input flow rate threshold, step S48 is performed: a new worker execution unit is enabled. Otherwise, no new worker execution unit is enabled.

That is, when the input flow rate exceeds the set input flow rate threshold, a new worker execution unit is enabled for messages corresponding to this TREE ID according to the method in the present embodiment.

Further, in the present embodiment, the input flow rate is calculated by sampling a message count according to an equal time interval. That is, a fixed sampling time interval is set to calculate the input flow rate.

After the new worker execution unit is enabled, step S49 is performed: the new worker execution unit is associated with the IO circular queue corresponding to the TREE ID field.

That is, the IO execution unit adds request data of the client to the input-direction circular queue, and the worker execution unit associated with the queue performs analytical calculation and writes final response data to an output-direction circular queue. Then, the IO execution unit is responsible for outputting and sending the response data to the client.

In practical applications, according to the above steps S41 to S49, an adaptive equalization control method for an SMB message in the present embodiment mainly includes the following process.

In step A1, a hash table length M for TREE_ID and a remainder N for a division method are set.

In step A2, a flow rate control threshold is set.

Here, the threshold has no fixed value, and a relatively appropriate value V0 is obtained by testing according to the practical processing capability of the server and the number of shared directories. Meanwhile, a relatively appropriate sampling time interval t0 for message rate calculation is set.

In step A3, when an SMB message is determined, a TREE ID field with a length of 4 bytes is extracted at a position with an offset of 36 bytes relative to SMB2_HEADER.

In step A4, if the read TREE ID is 0, an original Samba processing logic is executed in the IO execution unit.

In step A5, in case of a TREE_CONNECT message request, a 4-byte integer is randomly allocated in the IO execution unit and returned to the client as a subsequent session TREE ID.

In step A6, if the read TREE ID is not 0, an appropriate circular queue is calculated and found through a hash table by taking the TREE ID as a keyword.

In step A7, flow rate information of each non-zero TREE ID is cached in the IO execution unit, and every time when an SMB message is received, a message count N[tree id] increases by 1.

In step A8, when a rate calculation period t0 is reached, a flow rate value v(tree_id)=N[tree id]/t0 is calculated once.

In step A9, a range of v(tree_id) is judged. When the range exceeds a set value V0, a new worker execution unit is created automatically. When the range is lower than the set value V0 and the number of worker execution units is larger than 1, a worker execution unit is destroyed automatically.

Further, the multi-shared directory tree-oriented control method in the present embodiment further includes step S5: concurrency control is performed on the IO execution unit and the worker execution unit by using a lock-free atomic operation queue. Steps S5 and S4 are simultaneously performed in no sequence.

In the present embodiment, the lock-free atomic operation queue is a CAS atomic operation queue, whereby the concurrent execution efficiency may be improved effectively, and the data processing efficiency of the client is further improved. In the present embodiment, the CAS atomic operation queue is used, and queue implementation with an array does not involve memory allocation and release, so a ring array buffer in form of RING BUFFER may be selected in the present embodiment, HEAD points to the head of the queue for dequeuing operations, and TAIL points to the tail of the queue for enqueuing operations.

Specifically, step S5 in the present embodiment includes the following steps.

In S51, in an input direction, a concurrent lock-free atomic operation queue is set between the IO execution unit and each worker execution unit, and when an SMB message flow rate increases, a new worker execution unit is enabled.

In S52, in an output direction, a concurrent lock-free atomic operation queue is set between each worker execution unit and the IO execution unit.

In S53, during data storage, an input message is encapsulated as a fixed-length request object in Samba.

That is, in the present embodiment, a fixed-length data storage mode is used, and data of a fixed length is written or read every time.

In S54, during concurrent data processing, it is set that a single-producer multiple-consumer model is used for an input-direction circular queue and that a multiple-producer single-consumer model is used for an output-direction circular queue.

Through step S54, a new worker execution unit that may be generated dynamically may be dealt with more efficiently, thereby improving the concurrent data processing efficiency effectively.

In S55, a producer continuously writes data and modifies a position of a writer pointer, and a consumer continuously reads data and modifies a position of a read pointer.

Figure 3:
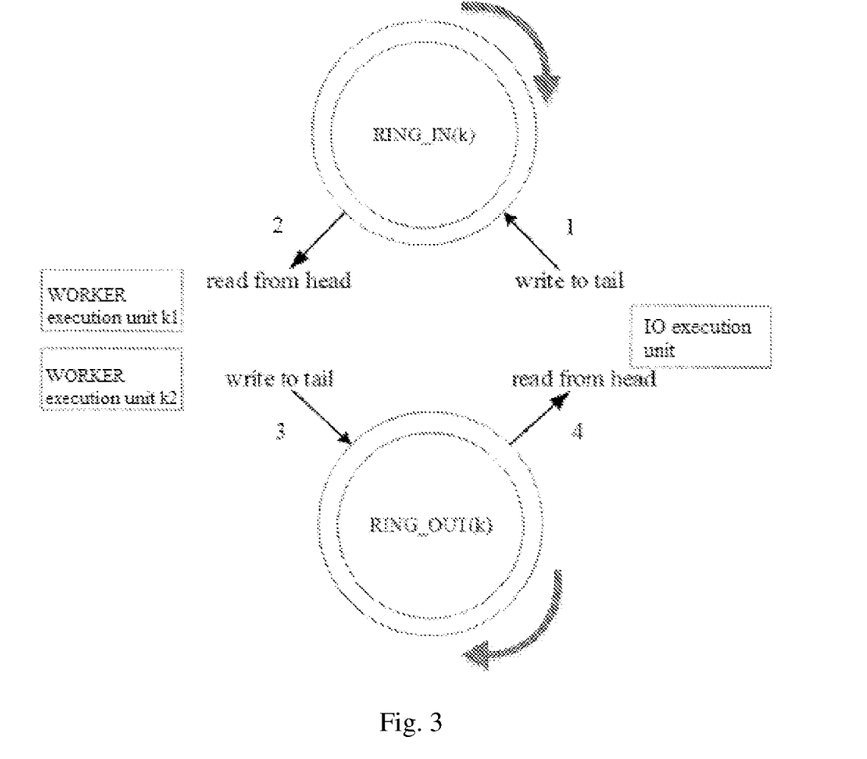
FIG. 3 is a schematic structural diagram of a circular queue between an IO execution unit and a worker execution unit.

In the present embodiment, a schematic structural diagram of a circular queue between the IO execution unit and the worker execution unit may refer to FIG. 3. FIG. 3 takes two worker execution units as an example. In FIG. 3, "write to tail" represents write to the tail, and "read from head" represents read from the head.

In combination with FIG. 3 and the above steps S51 to S55, it can be seen that, in practical applications, a concurrency control method for an SMB message between an IO execution unit and a worker execution unit mainly includes the following process.

In step B1, in an input direction, the IO execution unit dynamically allocates a Samba request structure, and encapsulates a received SMB message in the request structure.

In step B2, in the input direction, the IO execution unit judges whether MOD(TAIL+1, MAX_LEN) reaches the HEAD, MOD(A, B) represents a mathematical remainder calculation operation performed on B with A, and MAX_LEN represents a maximum length of a circle of a circular queue.

If YES, it indicates that the queue is full, and an error LOG is presented. Otherwise, a request data structure pointer is inserted into the TAIL of the circular queue, and TAIL=MOD(TAIL+1, MAX_LEN) is modified.

In step B3, in the input direction, the worker execution unit judges whether the HEAD reaches the TAIL.

If YES, it indicates that the queue is null, and the process is directly restarted without processing. Otherwise, a piece of request data is read from the HEAD, and HEAD-MOD (HEAD+1, MAX_LEN) is modified. Unlike step B2, a dequeuing operation is performed in an atomic operation mode.

In step B4, the worker execution unit extracts the SMB message from current request data, and performs a detailed file read-write process.

In step B5, in an output direction, the worker execution unit directly adds the processed request data structure to the TAIL of the circular queue. An execution strategy for the TAIL is the same as step B2, but is performed in the atomic operation mode here.

In step B6, in the output direction, the IO execution unit traverses the output circular queue, then extracts and sends SMB message information of the request data structure to a TCP socket, and finally releases the request data structure.

In summary, according to the present disclosure, an adaptive equalization algorithm and a lock-free concurrent queues are used, whereby fast and reliable concurrent processing of multiple shared directory trees may be implemented, and request data of a client may be appropriately hashed and sent to corresponding input queues. Therefore, the problem of nonfluency possibly caused by an existing serial processing mode may be solved effectively, and the data processing efficiency of the client may be improved greatly. From the angle of the Samba server, tasks are processed concurrently by a plurality of worker execution units, which contributes to improving the execution efficiency of a smbd subprocess. From the angle of the user, when a client mounts multiple NAS directories of the same server, the negative influence of operating one of the directories with large files on read-write processes of the other directories may be reduced effectively.

Embodiment 2

Figure 4:
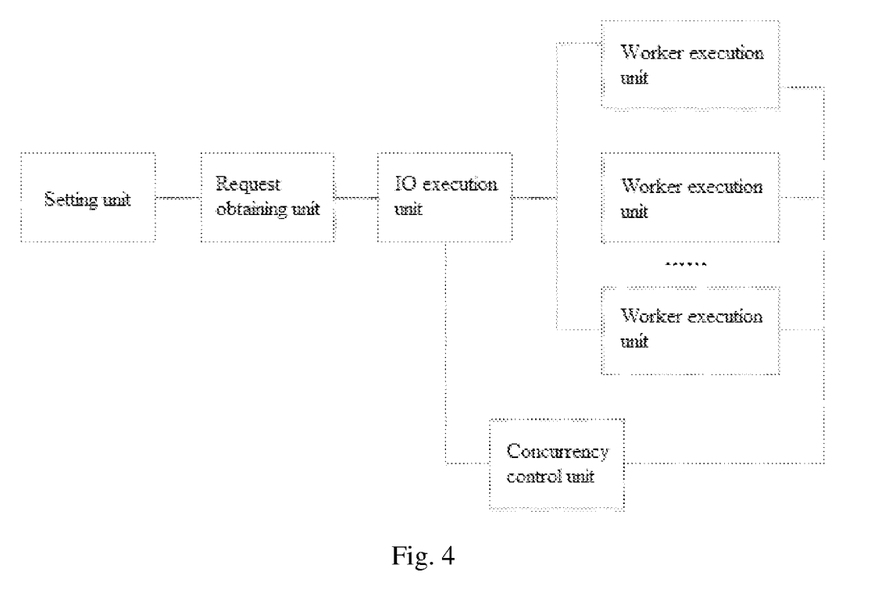
FIG. 4 is a schematic structural diagram of a multi-shared directory tree-oriented control system according to an embodiment of the present application.

Based on the embodiment shown in FIGS. 1 to 3, referring to FIG. 4, FIG. 4 is a schematic structural diagram of a multi-shared directory tree-oriented control system according to an embodiment of the present application. The control system in the present embodiment is arranged at a server, namely arranged at a Samba server.

As shown in FIG. 4, the multi-shared directory tree-oriented control system in the present embodiment mainly includes an IO execution unit, a plurality of worker execution units, a setting unit, a request obtaining unit, and a concurrency control unit. The IO execution unit is matched with the plurality of worker execution units.

The worker execution unit is configured to perform a calculation process in a Samba process. The setting unit is configured to set a number of circular queues and a number of worker execution units in a Samba configuration file of a server according to a number of directories to be shared, the circular queue is configured to perform data exchange between the IO execution unit and the worker execution unit. The request obtaining unit is configured to obtain a data read-write test request from a client. The IO execution unit is configured to orient request tasks of different directories to different worker execution units according to the data read-write test request by using an SMB message header data-based adaptive equalization control algorithm. The concurrency control unit is configured to perform concurrency control on the IO execution unit and the worker execution unit by using a lock-free atomic operation queue.

Figure 5:
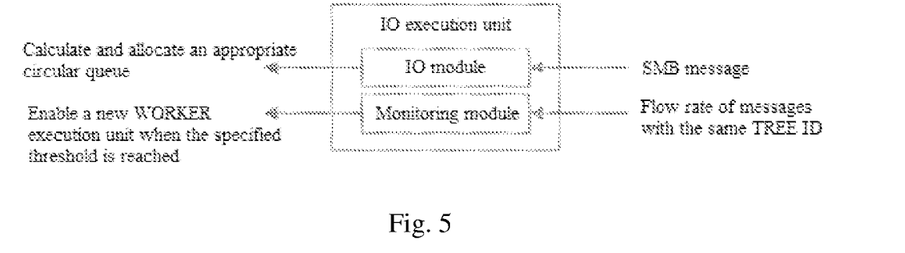
FIG. 5 is a schematic diagram of an adaptive equalization processing process of an IO execution unit.

The IO execution unit includes an IO module and a monitoring module. The IO module is configured to obtain SMB message data, and when a TREE ID field is not 0, calculate and determine a corresponding circular queue and worker execution unit through a hash table by taking the TREE ID field as a keyword. The monitoring module is configured to calculate an input flow rate of messages corresponding to each TREE ID, and judge whether the input flow rate exceeds a set input flow rate threshold. A schematic diagram of an adaptive equalization processing process of the IO execution unit in the present embodiment may refer to FIG. 5.

Further, the IO module includes a setting submodule, an extraction submodule, a first judgment submodule, a first execution submodule, and a second execution submodule. The setting submodule is configured to set a hash table length for a TREE ID and a remainder N for a division method according to a number of practically shared directories of the server. The extraction submodule is configured to extract the TREE ID field in an input-port SMB message. The first judgment submodule is configured to judge whether the TREE ID field is 0. The first execution submodule is configured to, when the TREE ID field is 0, execute an original Samba processing logic in the IO execution unit. The second execution submodule is configured to, when the TREE ID field is not 0, calculate and determine the corresponding circular queue and worker execution unit through the hash table by taking the TREE ID field of header data of the SMB message as the keyword.

The monitoring module includes an input flow rate calculation submodule, a second judgment submodule, an enabling submodule, and an association submodule. The input flow rate calculation submodule is configured to calculate an input flow rate according to a time interval between the currently received input-port SMB message and a latest message with the same TREE ID. The second judgment submodule is configured to judge whether the input flow rate exceeds the set input flow rate threshold. The enabling submodule is configured to, when the input flow rate exceeds the set input flow rate threshold, enable a new worker execution unit. The association submodule is configured to associate the new worker execution unit with the IO circular queue corresponding to the TREE ID field.

In the present embodiment, the concurrency control unit includes an input control module, an output control module, an enabling module, a request object encapsulation module, a model setting module, and a pointer modification module. The input control module is configured to, in an input direction, set a concurrent lock-free atomic operation queue between the IO execution unit and each worker execution unit. The output control module is configured to, in an output direction, set a concurrent lock-free atomic operation queue between each worker execution unit and the IO execution unit. The enabling module is configured to, when an SMB message flow rate increases, enable a new worker execution unit. The request object encapsulation module is configured to, during data storage, encapsulate an input message as a fixed-length request object in Samba. The model setting module is configured to, during concurrent data processing, set that a single-producer multiple-consumer model is used for an input-direction circular queue and that a multiple-producer single-consumer model is used for an output-direction circular queue. The pointer modification module is configured to modify a position of a writer pointer when a producer writes data, and modify a position of a read pointer when a consumer reads data.

The working principle and working method of the multi-shared directory tree-oriented control system in the present embodiment have been described in detail in the embodiment shown in FIGS. 1 to 3. The two embodiments may refer to each other. Elaborations are omitted herein.

The above is only the specific implementation mode of the present application, enabling those skilled in the art to understand or implement the present application. Various modifications to these embodiments are apparent to those skilled in the art. The general principle defined herein may be implemented in other embodiments without departing from the spirit or scope of the present application. Therefore, the present application will not be limited to these embodiments shown herein but conforms to the largest scope consistent with the principles and novel characteristics disclosed herein.

What is claimed is:

1. A multi-shared directory tree-oriented control method, comprising:
    setting a number of circular queues and a number of worker execution units in a Samba configuration file of a server according to a number of directories to be shared, wherein each of the worker execution units is configured to perform a calculation process in a Samba process, each of the circular queues is configured to perform data exchange between an Input/Output (IO) execution unit and a corresponding one of the worker execution units, and the IO execution unit is configured to obtain a directory request and orient the directory request to the corresponding one of the worker execution units;
    running a Samba main process on the server;
    obtaining a data read-write test request from a client; and
    orienting request tasks of individual directories to individual worker execution units according to the data read-write test request by using a Server Message Block (SMB) message header data-based adaptive equalization control algorithm, wherein the IO execution unit is matched with a plurality of the worker execution units, wherein the orienting request tasks of individual directories to individual worker execution units according to the data read-write test request by using the SMB message header data-based adaptive equalization control algorithm comprises:
        setting a hash table length for a TREE Identifier (ID) and a remainder N for a division method according to a number of practically shared directories of the server, wherein the division method is used to calculate a hash table index;
        extracting a TREE ID field in an input-port SMB message;
        judging whether the TREE ID field is 0;
        in response to the TREE ID field being 0, executing an original Samba processing logic in the IO execution unit;
        in response to the TREE ID field not being 0, calculating and determining a corresponding one of the circular queues through a hash table by taking the TREE ID field of header data of the input-port SMB message as a keyword;

calculating, by the IO execution unit, an input flow rate according to a time interval between a currently received input-port SMB message and a latest message with the same TREE ID;
judging whether the input flow rate exceeds a set input flow rate threshold;
in response to the input flow rate exceeding the set input flow rate threshold, enabling a new worker execution unit; and
associating the new worker execution unit with an IO circular queue corresponding to the TREE ID field.

2. The multi-shared directory tree-oriented control method according to claim 1, wherein the method further comprises:
performing concurrency control on the IO execution unit and the corresponding one of the worker execution units by using a lock-free atomic operation queue.

3. The multi-shared directory tree-oriented control method according to claim 2, wherein the lock-free atomic operation queue is a Compared And Swap (CAS) atomic operation queue.

4. The multi-shared directory tree-oriented control method according to claim 2, wherein the performing concurrency control on the IO execution unit and the corresponding one of the worker execution units by using the lock-free atomic operation queue comprises:
in an input direction, setting a concurrent lock-free atomic operation queue between the IO execution unit and each of the worker execution units, and in response to an SMB message flow rate increasing, enabling the new worker execution unit;
in an output direction, setting a concurrent lock-free atomic operation queue between each of the worker execution units and the IO execution unit;
during data storage, encapsulating an input message as a fixed-length request object in Samba;
during concurrent data processing, setting that a single-producer multiple-consumer model is used for an input-direction circular queue and that a multiple-producer single-consumer model is used for an output-direction circular queue; and
by a producer, continuously writing data and modifying a position of a writer pointer, and by a consumer, continuously reading data and modifying a position of a read pointer.

5. The multi-shared directory tree-oriented control method according to claim 1, wherein the running the Samba main process on the server comprises:
in response to the Samba main process receiving a mounting of a first shared directory to the client and being forked to obtain a smb daemon (smbd) subprocess for initialization, creating an IO thread and a plurality of worker threads as execution units.

6. A multi-shared directory tree-oriented control device, comprising:
a processor; and
a memory, storing a computer instruction executable by the processor, and upon execution of the computer instruction, is configured to:
set a number of circular queues and a number of worker execution units in a Samba configuration file of a server according to a number of directories to be shared, wherein each of the worker execution units is configured to perform a calculation process in a Samba process, each of the circular queues is configured to perform data exchange between an Input/Output (IO) execution unit and a corresponding one of the worker execution units, and the IO execution unit is configured to obtain a directory request and orient the directory request to the corresponding one of the worker execution units;
run a Samba main process on the server;
obtain a data read-write test request from a client;
orient request tasks of individual directories to individual worker execution units according to the data read-write test request by using a Server Message Block (SMB) message header data-based adaptive equalization control algorithm, wherein the IO execution unit is matched with a plurality of the worker execution units;
set a hash table length for a TREE Identifier (ID) and a remainder N for a division method according to a number of practically shared directories of the server, wherein the division method is used to calculate a hash table index;
extract a TREE ID field in an input-port SMB message;
judge whether the TREE ID field is 0;
in response to the TREE ID field being 0, execute an original Samba processing logic in the IO execution unit;
in response to the TREE ID field not being 0, calculate and determine a corresponding one of the circular queues through a hash table by taking the TREE ID field of header data of the input-port SMB message as a keyword;
calculate, by the IO execution unit, an input flow rate according to a time interval between a currently received input-port SMB message and a latest message with the same TREE ID;
judge whether the input flow rate exceeds a set input flow rate threshold;
in response to the input flow rate exceeding the set input flow rate threshold, enable a new worker execution unit; and
associate the new worker execution unit with an IO circular queue corresponding to the TREE ID field.

7. The multi-shared directory tree-oriented control device according to claim 6, wherein the processor, upon execution of the computer instruction, is further configured to:
perform concurrency control on the IO execution unit and the corresponding one of the worker execution units by using a lock-free atomic operation queue.

8. The multi-shared directory tree-oriented control device according to claim 7, wherein the lock-free atomic operation queue is a Compared And Swap (CAS) atomic operation queue.

9. The multi-shared directory tree-oriented control device according to claim 7, wherein the processor, upon execution of the computer instruction, is further configured to:
in an input direction, set a concurrent lock-free atomic operation queue between the IO execution unit and each of the worker execution units, and in response to an SMB message flow rate increasing, enable the new worker execution unit;
in an output direction, set a concurrent lock-free atomic operation queue between each of the worker execution units and the IO execution unit;
during data storage, encapsulate an input message as a fixed-length request object in Samba;
during concurrent data processing, set that a single-producer multiple-consumer model is used for an input-direction circular queue and that a multiple-producer single-consumer model is used for an output-direction circular queue; and by a producer, continuously write data and modify a position of a writer pointer, and by a consumer, continuously read data and modify a position of a read pointer.

10. The multi-shared directory tree-oriented control device according to claim 6, wherein the processor, upon execution of the computer instruction, is further configured to:
in response to the Samba main process receiving a mounting of a first shared directory to the client and being forked to obtain a smb daemon (smbd) subprocess for initialization, create an IO thread and a plurality of worker threads as execution units.

11. A non-transitory computer-readable storage medium, storing a computer program, wherein the computer program, upon execution by a processor, is configured to cause the processor to:
set a number of circular queues and a number of worker execution units in a Samba configuration file of a server according to a number of directories to be shared, wherein each of the worker execution units is configured to perform a calculation process in a Samba process, each of the circular queues is configured to perform data exchange between an Input/Output (IO) execution unit and a corresponding one of the worker execution units, and the IO execution unit is configured to obtain a directory request and orient the directory request to the corresponding one of the worker execution units;
run a Samba main process on the server;
obtain a data read-write test request from a client;
orient request tasks of individual directories to individual worker execution units according to the data read-write test request by using a Server Message Block (SMB) message header data-based adaptive equalization control algorithm, wherein the IO execution unit is matched with a plurality of the worker execution units;
set a hash table length for a TREE Identifier (ID) and a remainder N for a division method according to a number of practically shared directories of the server, wherein the division method is used to calculate a hash table index;
extract a TREE ID field in an input-port SMB message;
judge whether the TREE ID field is 0;
in response to the TREE ID field being 0, execute an original Samba processing logic in the IO execution unit;
in response to the TREE ID field not being 0, calculate and determine a corresponding one of the circular queues through a hash table by taking the TREE ID field of header data of the input-port SMB message as a keyword;
calculate, by the IO execution unit, an input flow rate according to a time interval between a currently received input-port SMB message and a latest message with the same TREE ID;
judge whether the input flow rate exceeds a set input flow rate threshold;
in response to the input flow rate exceeding the set input flow rate threshold, enable a new worker execution unit; and
associate the new worker execution unit with an IO circular queue corresponding to the TREE ID field.

12. The non-transitory computer-readable storage medium according to claim 11, wherein the computer program, upon execution by the processor, is further configured to cause the processor to:
perform concurrency control on the IO execution unit and the corresponding one of the worker execution units by using a lock-free atomic operation queue.

13. The non-transitory computer-readable storage medium according to claim 12, wherein the lock-free atomic operation queue is a Compared And Swap (CAS) atomic operation queue.

14. The non-transitory computer-readable storage medium according to claim 12, wherein the computer program, upon execution by the processor, is further configured to cause the processor to:
in an input direction, set a concurrent lock-free atomic operation queue between the IO execution unit and each of the worker execution units, and in response to an SMB message flow rate increasing, enable the new worker execution unit;
in an output direction, set a concurrent lock-free atomic operation queue between each of the worker execution units and the IO execution unit;
during data storage, encapsulate an input message as a fixed-length request object in Samba;
during concurrent data processing, set that a single-producer multiple-consumer model is used for an input-direction circular queue and that a multiple-producer single-consumer model is used for an output-direction circular queue; and
by a producer, continuously write data and modify a position of a writer pointer, and by a consumer, continuously read data and modify a position of a read pointer.

15. The non-transitory computer-readable storage medium according to claim 11, wherein the computer program, upon execution by the processor, is further configured to cause the processor to:
in response to the Samba main process receiving a mounting of a first shared directory to the client and being forked to obtain a smb daemon (smbd) subprocess for initialization, create an IO thread and a plurality of worker threads as execution units.

* * * * *